US010826051B2

(12) United States Patent
Weng et al.

(10) Patent No.: US 10,826,051 B2
(45) Date of Patent: Nov. 3, 2020

(54) METHOD FOR PRODUCING ANODE MATERIAL OF LITHIUM ION BATTERY FROM FLEXIBLE GRAPHITE POWDER

(71) Applicant: NATIONAL CHUNG SHAN INSTITUTE OF SCIENCE AND TECHNOLOGY, Taoyuan (TW)

(72) Inventors: Biing-Jyh Weng, Taoyuan (TW); Bo-Wen Chen, Taoyuan (TW); Ching-Jang Lin, Taoyuan (TW); Cheng-Hsiang Hwang, Taoyuan (TW); Jin-Tarng Hwang, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 432 days.

(21) Appl. No.: 15/383,743

(22) Filed: Dec. 19, 2016

(65) Prior Publication Data

US 2018/0175435 A1 Jun. 21, 2018

(51) Int. Cl.
*H01M 4/04* (2006.01)
*H01M 10/0525* (2010.01)
(Continued)

(52) U.S. Cl.
CPC ....... *H01M 4/0404* (2013.01); *H01M 4/0435* (2013.01); *H01M 4/0471* (2013.01);
(Continued)

(58) Field of Classification Search
CPC .............................. H01M 4/133; H01M 4/1393
See application file for complete search history.

(56) References Cited

U.S. PATENT DOCUMENTS

| 3,404,061 A * | 10/1968 | Shane | C04B 20/06 |
| | | | 428/143 |
| 6,413,672 B1 * | 7/2002 | Suzuki | H01M 4/04 |
| | | | 429/231.8 |

(Continued)

FOREIGN PATENT DOCUMENTS

| TW | 508604 | 11/2002 |
| TW | 200832796 | 8/2008 |
| TW | 201543734 | 11/2015 |

OTHER PUBLICATIONS

Yazici, M et al. "Flexible Graphite as Battery Anode and Current Collector". Journal of Power Sources, vol. 141, No. 1, 2005, pp. 171-176. doi:10.1016/j.jpowsour.2004.09.009. (Year: 2005).*

(Continued)

*Primary Examiner* — Robert S Carrico
(74) *Attorney, Agent, or Firm* — WPAT, PC

(57) ABSTRACT

A method for producing the anode material of a lithium ion battery from flexible graphite powder, comprising (A) providing a dry flexible graphite, and pulverizing the dry flexible graphite by a pulverizing step, and filtering the dry flexible graphite with a sieve screen to obtain a uniform flexible graphite powder, (B) performing a ball-grinding step for the uniform flexible graphite powder by mixing with a solvent to obtain a liquid containing flexible graphite; (C) coating the liquid containing flexible graphite on a metal foil, and performing a rolling step to obtain an anode material. Then, the anode material is processed in its shape and is formed into an anode electrode plate. Thereafter, the anode electrode plate is stacked with a lower cover of the battery, a separating paper, a cathode electrode plate, a spring sheet and an upper cover of the battery to assemble the lithium ion battery.

9 Claims, 1 Drawing Sheet

(51) Int. Cl.
*H01M 4/587* (2010.01)
*H01M 4/133* (2010.01)
*H01M 4/1393* (2010.01)
*H01M 4/02* (2006.01)

(52) U.S. Cl.
CPC ......... *H01M 4/133* (2013.01); *H01M 4/1393* (2013.01); *H01M 4/587* (2013.01); *H01M 10/0525* (2013.01); *H01M 2004/027* (2013.01)

(56) References Cited

U.S. PATENT DOCUMENTS

| | | | | |
|---|---|---|---|---|
| 6,555,271 | B1* | 4/2003 | Greinke | H01M 4/043 |
| | | | | 429/215 |
| 2002/0045100 | A1* | 4/2002 | Honbo | C01B 32/20 |
| | | | | 429/231.8 |
| 2010/0092871 | A1* | 4/2010 | Medlege | H01M 4/139 |
| | | | | 429/326 |
| 2013/0212879 | A1* | 8/2013 | Ogino | H01R 43/16 |
| | | | | 29/885 |
| 2017/0062822 | A1* | 3/2017 | Hwang | H01M 4/587 |

OTHER PUBLICATIONS

Rong Tsong Precision Technology Co. E-Catalog. 2015, <http://files.rtco.com.tw/RTCOedm/ebook.html>. Accessed Apr. 2, 2019. (Year: 2015).*
Sigma-Aldrich. "Particle Size Conversion Table." Apr. 17, 2015, <https://web.archive.org/web/20150417033904/http://www.sigmaaldrich.com/chemistry/stockroom-reagents/learning-center/technical-library/particle-size-conversion.printerview.html>. Accessed Apr. 3, 2019. (Year: 2015).*
English Abstract Translation for TW200832796.
English Abstract Translation for TW508604.
English Abstract Translation for TW201543734.

* cited by examiner

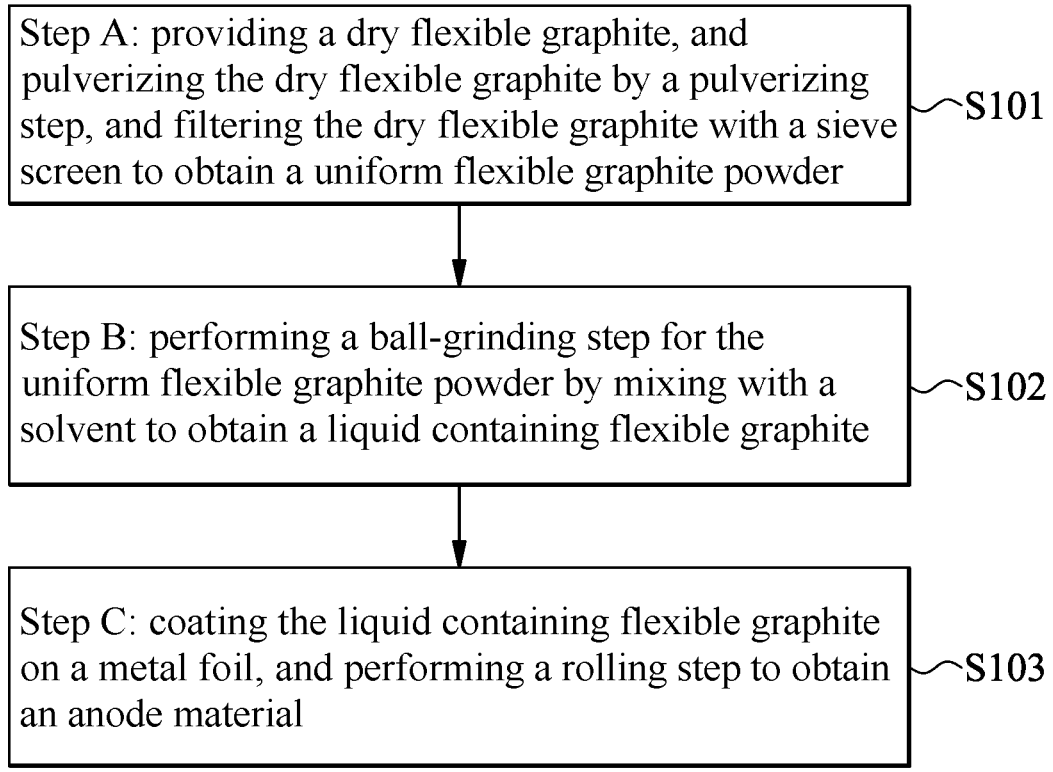

METHOD FOR PRODUCING ANODE MATERIAL OF LITHIUM ION BATTERY FROM FLEXIBLE GRAPHITE POWDER

FIELD OF THE INVENTION

The present invention relates to a method for producing the anode material of battery and, more particularly, to a method for producing the anode material of lithium ion battery which includes flexible graphite powder.

BACKGROUND OF THE INVENTION

The current 3C products, the future electrical automobiles, the smart electric grids or the cloud techniques all highly relies on the lithium ion battery. Besides, the electric energy which is generated by solar energy or wind power also relies on the lithium ion battery to use it as an energy-reserving device. Since the market is huge, this has been an evident trend.

Because of rapid development of the technology and living quality in the present day, each kind of the 3C products tends to be produced to be light, thin, short, small and multi-functional. Under the requirements of safety use, low cost and high quality of the battery and the requirement of environmental protection, lithium ion battery with high performance is produced, wherein the anode material of lithium ion battery can be made of mesophase carbon microbead, natural graphite or artificial graphite.

Lithium ion battery with high performance can meet the requirement of small size and light weight and thus can be used for the tablet PC or the mobile phone. But, it is required for the material to have high energy density (high capacity) and the charge/discharge rate has to be accomplished within 0.5-1 hour. Therefore, the capacity of the lithium ion battery which uses the natural graphite and the artificial graphite as the anode material is difficult to exceed the theoretical capacity 372 mAh/g. In addition, it is difficult for the lithium ion and the electrolyte to have a mass transfer that make them diffuse into the internal structure, the charge/discharge rate of the battery itself is limited.

The flexible graphite powder is an electrically conductive material with low electrical resistance and high thermal conduction, and has low density and large specific surface area and is porous. Besides, the layers thereof have gaps therebetween that allow some compounds to be introduced into. And, each single layer of the graphite structure can effectively reserve an amount of lithium ion which is higher than two times of that reserved by the natural graphite. Currently, the flexible graphite powder is used in the industries, such as printed circuit board (TW200832796), ultra capacitor (TW508604) and electrode plate (TW201543734). However, with regard to processing of the flexible graphite powder, the flexible graphite powder has the disadvantage of brittle property and is difficult to be further processed, and thus the yield thereof is low.

Therefore, there is a need for the industry to develop a method for producing the anode material of lithium ion battery from flexible graphite powder, which uses the flexible graphite powder to increase the capacity and the charge/discharge rate to have high energy density. By using flexible graphite powder as the raw material, the anode material of lithium ion battery can be produced, thereby the performance and quality can be both satisfied to produce the anode material of lithium ion battery with high quality and high yield.

SUMMARY OF THE INVENTION

In view of the aforesaid drawbacks of the prior art, it is a main objective of the present invention to provide a method for producing the anode material of a lithium ion battery from flexible graphite powder, which involves a uniform flexible graphite powder, a solvent and a metal foil to perform a ball-grinding step and a rolling step for obtaining the desired anode material.

To achieve the above object, the present invention provides a method for producing the anode material of a lithium ion battery from flexible graphite powder, comprising the steps of: (A) providing a dry flexible graphite, and pulverizing the dry flexible graphite by a pulverizing step, and filtering the dry flexible graphite with a sieve screen to obtain a uniform flexible graphite powder, (B) performing a ball-grinding step for the uniform flexible graphite powder by mixing with a solvent to obtain a liquid containing flexible graphite; (C) coating the liquid containing flexible graphite on a metal foil, and performing a rolling step to obtain an anode material.

In the above step (A), the pulverizing step is to put the dry flexible graphite into the pulverizer RT-N12 and to perform pulverization at the speed higher than 26000 rpm (but not limited thereto), and to put the dry flexible graphite into an oven for being dried. After being filtered through a sieve screen of 80-400 mesh (but not limited thereto), the flexible graphite powder having very uniformly distributed particle size can be obtained.

In step (B), the solvent can be N-Methyl pyrrolidone (NMP) (but not limited thereto), such as a solvent containing 10% of PVDF/NMP. And, the ball-grinding step employs a ball-grinder having plural ceramic balls disposed therein to perform ball-grinding. In addition, conductive additives, such as KS-4 and SuperP, can be added in a particular proportion for the ball-grinding step to make the liquid containing flexible graphite includes the conductive additives of a certain proportion.

In step (C), the metal foil can be a copper foil (but not limited thereto). The liquid containing flexible graphite can be uniformly coated by the scraper onto the copper foil to have a thickness of 20-200 μm (but not limited thereto). After a roller is used to densify the copper foil sheet (for adjusting the gap to be less than 1 mm, but not limited thereto), the copper foil sheet is cut to form the circular anode electrode plate having a diameter of 12 mm (but not limited thereto). The above-formed anode electrode plate is stacked with a lower cover of the battery, a separating paper, a cathode electrode plate, a spring sheet and an upper cover of the battery to assemble the lithium ion battery.

Both the above summary and the following description and drawings aim to further explain the techniques and means required to achieve the predetermined objectives of the present invention as well as the effects thereof. The other objectives and advantages of the present invention are described in the following description and drawings.

BRIEF DESCRIPTION OF THE DRAWINGS

FIG. 1 is a flow chart illustrating a method for producing the anode material of a lithium ion battery from flexible graphite powder.

DETAILED DESCRIPTION OF THE PREFERRED EMBODIMENTS

The following will illustrate the embodiments of the present invention by specific examples. Any persons skilled in the art could easily understand the advantages and the effects of the present invention from the disclosed contents in the present specification.

Conventionally, the natural graphite is used as the anode material, wherein the capacity is 320-350 mAh/g, and the capacity decreases rapidly to 200-250 mAh/g at 5 C-Rate charge/discharge rate. In contrast, because the ions are interposed between the layers of flexible graphite, the distance between the z-axil layers can be increases, and thus the capacity thereof is higher than that of the natural graphite. Besides, because of increase of the distance between the layers, the surface area is increased, and a large amount of activated sites and contacting surfaces are formed, which makes the area for electrochemical reactions of charge/discharge increased. Therefore, the flexible graphite powder which can achieve the effect of rapid charge/discharge can increase the capacity and the charge/discharge rate. Generally, the capacity of the flexible graphite can achieve as high as at least 350 mAh/g at 5 C-Rate.

The present invention uses high-speed pulverizer to pulverize the flexible graphite powder and classify the same. Microscopically, the graphite sheets with uniform particle size can be obtained, which increases the particle size uniformity of the flexible graphite. It can be uniformly coated on the copper foil and thus an anode electrode plate is formed. Since the anode electrode plate (the graphite electrode plate) has high electrical conductivity and the layered-structure has gaps produced by acid intercalation that allows more lithium ions to be reserved in the material, the anode material of lithium ion battery produced in accordance with the present invention has the property of high capacity. The present invention uses the natural graphite powder in flakes as the raw material of the flexible graphite. After acidification treatment and subsequent water rinsing step and drying treatment, the expandable graphite powder is obtained. After heating the expandable graphite powder at high temperature (700-1000° C.) to perform instant heating, a vermicular expanded graphite is obtained, which has an expansion that achieve 100-500 times of the original size. Finally, the vermicular expanded graphite is rolled to produce the flexible graphite. The flexible graphite can be prepared after a high pressure sintering process (about 10-100 kN/cm$^2$, 2000-3000° C.).

Please refer to FIG. 1 which illustrates a method for producing the anode material of lithium ion battery from the flexible graphite powder. As shown, the present invention provides a method for producing carbide raw material, comprising the steps of: (A) providing a dry flexible graphite, and pulverizing the dry flexible graphite by a pulverizing step, and filtering the dry flexible graphite with a sieve screen to obtain a uniform flexible graphite powder (Step S101), wherein the pulverizing step is to put the dry flexible graphite into the pulverizer RT-N12 and to perform pulverization at the speed higher than 26000 rpm, and to put the dry flexible graphite into an oven for being dried, wherein the solvent is NMP; (B) performing a ball-grinding step for the uniform flexible graphite powder by mixing with a solvent to obtain a liquid containing flexible graphite (Step S102), wherein the solvent is N-Methyl pyrrolidone (NMP), and the ball-grinding step employs a ball-grinder having plural ceramic balls disposed therein to perform ball-grinding; (C) coating the liquid containing flexible graphite on a metal foil, and performing a rolling step to obtain an anode material (Step S103), wherein the metal foil is a copper foil (sheet).

EMBODIMENT

A process for producing lithium ion battery by using the flexible graphite as the anode material includes the following steps:

(1) After performing acidification treatment for the natural graphite powder, the powdery graphite is treated at high temperature (700-1000° C.), turning the powdery graphite into the vermicular graphite powder.

(2) The vermicular graphite powder is rolled to form the green body of the porous flexible graphite.

(3) The green body of the porous flexible graphite is put into the high-temperature oven and is sintered at high pressure (about 10-100 kN/cm$^2$, 2000-3000° C.) to obtain the flexible graphite.

(4) The flexible graphite is put into the pulverizer RT-N12 and is pulverized at 26000 rpm for 10-30 seconds, and is then cooled for 1-5 minutes. After repeating this step 5-10 times, it is put into the oven at 105° C. for 2 hours to remove water. Subsequently, the above powder is put on a sieve screen of 80-400 mesh and is filtered by vibration for 1 hour, and the lower layer of the powder is collected. Then, it is put again into the oven to be dried for at least 4 hours.

(5) The graphite powder used as the anode material is weighted. Next, conductive additives, such as KS-4 and SuperP, are added thereinto. Next, it is put into a ball-grinding tank of 50 mL, where plural ceramic balls are disposed therein. The rotation speed is adjusted to 350 rpm, and it is grinded for 4 hours. Then, a solvent containing 10% of PVDF/NMP is added thereinto. Depending on viscosity of the liquid, several grams of NMP are further dropped thereinto, and it is further grinded in the ball-grinder for 1 hour.

(6) A copper foil with length and width of 20 cm×10 cm and having thickness of 20-30 μm is provided. The above liquid in the grinding tank is then put in a scraping device, and is uniformly coated by the scraper onto the copper foil to have a thickness of 20-200 μm. Further, the copper foil having a humid film is put into the oven for being dried, where the temperature is adjusted to 80° C. and it is retained therein until the time before daybreak (about 16-20 hours).

(7) A roller is used to densify the copper foil sheet for adjusting the gap to be less than 1 mm. Then, a punching/cutting machine is used to cut the rolled copper foil to form the circular anode electrode plate having a diameter of 12 mm. The weight of the circular anode electrode plate and the weight of some circular copper foils having the same shape are measured, obtaining the weight of the anode material on the electrode sheet. Further, the electrode sheet is put into the oven at 90° C. for 3 hours to remove water, and is placed in the drying room for over 12 hours.

(8) The cleaned battery module materials (including the upper and lower cover of the battery (CR2032), the electrode plate of stainless steel, and the spring sheet) and a separating paper (Celgard 2325) of 15 mm which has been cut are provided. The lower cover of the battery, the anode electrode plate, the separating paper, the cathode electrode plate, the spring sheet and the upper cover of the battery are stacked from the bottom to the top with three drops of 1M LiPF6 electrolyte (EC:EMC:DMC=1:1:1) being dropped into each layer. The stack is put into the compressing moulding device and is pressed to complete assembly of the lithium ion battery.

(9) The battery in the mould is taken out, and is put into the bag where a number is assigned and the weight of the anode electrode plate and the constituent parts and proportion thereof are indicated. Based on the weight of the anode material in the battery and the theoretical capacity thereof, the current is calculated for measuring the C-Rate. At the same time, the capacity of the battery is recorded which is used to calculate the capacitance density and the coulombic efficiency.

The present invention uses the above flexible graphite powder to fabricate the coin cell battery, and conducts a semi-battery capacity test where the capacity-measuring machine is made in Taiwan with the model no. BAT-750B, and the current density that is tested is within the range 0.1-5.0 C-Rate. The experimental result is shown in Table 1.

TABLE 1

Capacity test of the embodiment

| | Current density (C-Rate) | | | | | |
|---|---|---|---|---|---|---|
| | 0.1 | 0.2 | 0.5 | 1.0 | 2.0 | 5.0 |
| Reversible capacity (mAh/g) | 393.95 | 384.58 | 381.32 | 380.23 | 377.40 | 368.03 |

From Table 1, it can be known that the capacity of the flexible graphite obtained from 0.1 C-Rate is about 390 mAh/g, and the capacity gradually and slowly decreases with increase of C-Rate, and the capacity can be maintained at 368 mAh/g at 5.0 C-Rate. It reveals that, at high charge/discharge rate, the flexible graphite powder has the property of high capacity.

In view of the property of the flexible graphite, the present invention uses the flexible graphite as the anode material of lithium ion battery, which has the advantages of high capacity and high charge/discharge rate, etc. The measured reversible capacity is as high as 400 mAh/g, which increases the capacity of general natural graphite material (330-350 mAh/g) by about 15-20%.

The above embodiments are just illustrated to explain the characteristics and the effects of the present invention and are not used to limit the scope of the substantial content of the present invention. Any persons skilled in the art can make modifications and changes to the above embodiments without departing from the spirit and scope of the present invention. Accordingly, the scope intended to be protected by the present invention should be defined by the appended claims.

What is claimed is:

1. A method for producing the anode material of a lithium ion battery from flexible graphite powder, comprising:
    (A) performing an acidification treatment for a natural graphite powder, turning the natural graphite powder into a powdery graphite, and treating the powdery graphite at a high temperature of 700-1000° C., turning the powdery graphite into a vermicular graphite powder;
    (B) rolling the vermicular graphite powder to form a green body of porous flexible graphite;
    (C) providing a dry flexible graphite, and pulverizing the dry flexible graphite by a pulverizing step, and filtering the dry flexible graphite with a sieve screen to obtain a uniform flexible graphite powder, wherein the dry flexible graphite is made from the green body of porous flexible graphite, wherein the green body of porous flexible graphite undergoes a sintering process at a temperature 2000-3000° C. and a pressure of 10-100 kN/cm$^2$ to obtain the dry flexible graphite;
    (D) performing a ball-grinding step for the uniform flexible graphite powder by mixing with a solvent to obtain a liquid containing uniform flexible graphite powder; and
    (E) coating the liquid containing uniform flexible graphite powder on a metal foil to form a metal foil with a graphite coating provided thereon, and performing a rolling step to obtain the anode material, wherein the rolling step comprising densifying the metal foil with a graphite coating provided thereon by a roller with a gap less than 1 mm.

2. The method for producing the anode material of a lithium ion battery from flexible graphite powder as claimed in claim 1, wherein the pulverizing step is to put the dry flexible graphite into a pulverizer RT-N12 and to perform pulverization at a speed higher than 26000 rpm, and to put the dry flexible graphite into an oven for being dried.

3. The method for producing the anode material of a lithium ion battery from flexible graphite powder as claimed in claim 1, wherein the sieve screen is of 80-400 mesh.

4. The method for producing the anode material of a lithium ion battery from flexible graphite powder as claimed in claim 1, wherein the solvent is NMP.

5. The method for producing the anode material of a lithium ion battery from flexible graphite powder as claimed in claim 1, wherein the ball-grinding step employs a ball-grinder having plural ceramic balls disposed therein to perform ball-grinding.

6. The method for producing the anode material of a lithium ion battery from flexible graphite powder as claimed in claim 1, wherein the metal foil is a copper foil.

7. The method for producing the anode material of a lithium ion battery from flexible graphite powder as claimed in claim 6, wherein the liquid containing uniform flexible graphite powder is coated on the metal foil to have a thickness of 20-200 μm.

8. The method for producing the anode material of a lithium ion battery from flexible graphite powder as claimed in claim 1, wherein the anode material is processed in its shape and is formed into an anode electrode plate.

9. The method for producing the anode material of a lithium ion battery from flexible graphite powder as claimed in claim 8, wherein the anode electrode plate is stacked with a lower cover of the battery, a separating paper, a cathode electrode plate, a spring sheet and an upper cover of the battery to assemble the lithium ion battery.

* * * * *